United States Patent
Aerrabotu

(10) Patent No.: US 6,829,492 B2
(45) Date of Patent: Dec. 7, 2004

(54) SERVICE LOCK RELEASE FOR A WIRELESS COMMUNICATION DEVICE

(75) Inventor: Naveen Aerrabotu, Gurnee, IL (US)

(73) Assignee: Motorola, Inc., Schaumburg, IL (US)

( * ) Notice: Subject to any disclaimer, the term of this patent is extended or adjusted under 35 U.S.C. 154(b) by 61 days.

(21) Appl. No.: 10/295,176

(22) Filed: Nov. 15, 2002

(65) Prior Publication Data

US 2004/0097271 A1 May 20, 2004

(51) Int. Cl.$^7$ ............................................. H04M 1/00
(52) U.S. Cl. ................... 455/565; 455/410; 455/411; 455/412.1; 455/412.2; 455/418; 455/567; 455/558; 455/556.2
(58) Field of Search ............................. 455/410, 565, 455/411, 567, 418, 419, 412.1, 424, 414, 412.2, 556.1, 556.2, 558

(56) References Cited

U.S. PATENT DOCUMENTS

| | | | |
|---|---|---|---|
| 5,625,669 A | * 4/1997 | McGregor et al. | .......... 455/418 |
| 5,684,861 A | * 11/1997 | Lewis et al. | ................. 455/405 |
| 5,842,124 A | 11/1998 | Kenagy et al. | |
| 5,918,160 A | * 6/1999 | Lysejko et al. | ................ 455/74 |
| 6,243,574 B1 | * 6/2001 | McGregor et al. | .......... 455/418 |
| 6,282,407 B1 | * 8/2001 | Vega et al. | ................. 455/41.1 |
| 6,405,049 B2 | * 6/2002 | Herrod et al. | .............. 455/517 |
| 6,542,738 B2 | * 4/2003 | Keenan et al. | .............. 455/424 |
| 6,600,930 B1 | * 7/2003 | Sakurai et al. | ........... 455/414.3 |
| 6,636,489 B1 | * 10/2003 | Fingerhut | ................... 370/328 |

* cited by examiner

Primary Examiner—Marceau Milord
(74) Attorney, Agent, or Firm—Shigeharu Furukawa

(57) ABSTRACT

Apparatus and method for controlling access to configuration of a wireless communication device (100) are provided. Once the access control is enabled, the wireless communication device keeps track the elapsed time (212, 310) using an internal timing circuitry (116), and compares it against a predetermined duration (214, 312). When the elapsed time exceeds the predetermined duration, the access to configuration is changed (216, 314).

10 Claims, 3 Drawing Sheets

SERVICE LOCK RELEASE FOR A WIRELESS COMMUNICATION DEVICE

FIELD OF THE INVENTION

The present invention relates generally to communication devices, more particularly to wireless communication devices having the capability of releasing a service lock.

BACKGROUND OF THE INVENTION

In a wireless communication system such as a cellular telephone network, a subscriber generally has a subscription contract with a service provider for a certain subscription period to use his or her wireless communication device within the system. The subscription contract typically imposes a penalty to the subscriber if he or she terminates the contract before the subscription period expires. After the expiration of the subscription period, the subscriber is no longer bound to the service provider by the subscription contract, and may seek a different subscription contract with a different service provider. On the other hand, the subscriber may continue using his or her wireless communication device with the current service provider's system under the terms described in the original subscription contract or a new subscriber contract.

Many wireless communication devices have a service lock that secures its configuration information. If the subscriber is aware of the expiration of the subscription period and desires to have a different subscription contract with another service provider using the same wireless communication device, then the wireless communication device must be "unlocked" or released from a current configuration set by the current service provider in order to accept a new configuration to be set by a new service provider. The current configuration may be "unlocked" or released by obtaining an access code from the current service provider and entering it into the wireless communication device. The wireless communication device is ready to accept a new configuration if entry of the access code is successful.

Unfortunately, the subscriber may not be notified of the expiration of the subscription period, and may not even be aware that the subscription period has expired. Accordingly, there is a need for a device having an improved and convenient method for releasing its service lock.

DETAILED DESCRIPTION OF THE PREFERRED EMBODIMENT(S)

When a subscriber receives a wireless communication device such as a cellular telephone, the wireless communication device is configured specifically to match the configuration defined by a service provider with whom the subscriber has a service contract, but is also configured to work in any compatible communication networks. The present invention provides an apparatus and method for providing the wireless communication device to be able accept a configuration specified by a different service provider upon the expiration of the current service contract allowing the subscriber to switch the service provider. The present invention may also be employed to provide temporary use of a wireless communication device to a third party. For example, the subscriber may allow temporary use of his or her wireless communication device to a friend for a specific number of days.

Figure 1:
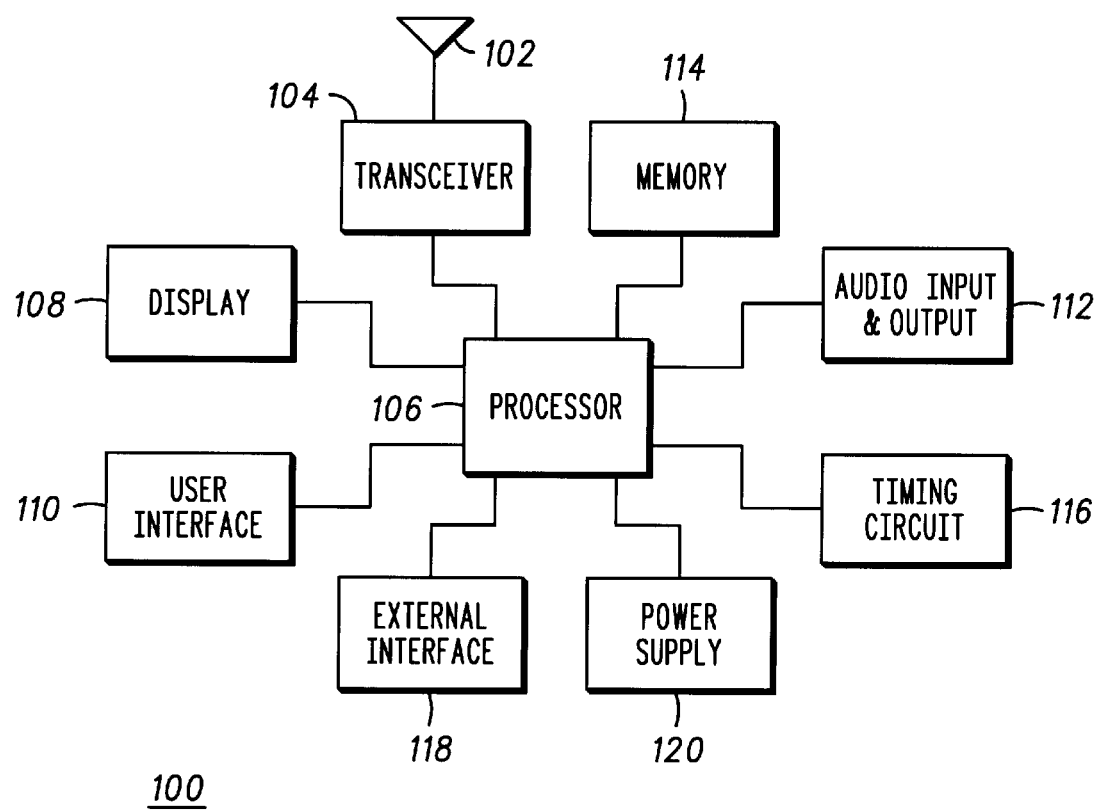
FIG. 1 is an exemplary block diagram of a preferred embodiment of the present invention.

Referring to FIG. 1, there is shown an exemplary wireless communication device 100 having service lock functionality in accordance with the present invention. The device may be, but is not limited to, a radiotelephone (such as a cellular phone or two-way radio), a paging device, a personal digital assistant ("PDA"), a handheld computer, an audio/video device (such as a television or an MP3 player), a network browsing device, a tablet for pen, a touchpad for finger and pen, a touch keypad for finger, a virtual pen, and any type of computing device.

FIG. 1 is a representation of internal components of the exemplary wireless communication device 100. The preferred embodiment includes an antenna 102; a transceiver 104; a processor 106; a display 108; a user interface 110; an audio input & output 112; a memory circuit 114; and a timing circuit 116. Upon reception of wireless signals, the internal components 100 detect the signals through the antenna 102 to producing detected voice and/or data signals. The transceiver 104, coupled to the antenna 102, converts the detected signals into electrical baseband signals and demodulates the electrical baseband signals to recover incoming information, such as voice and/or data, transmitted by the wireless signals. After receiving the incoming information from the transceiver 104, the processor 106 formats the incoming information for output to the display 108 and/or audio input & output 112. Likewise, for transmission of wireless signals, the processor 106 formats outgoing information and conveys it to the transceiver 104 for modulation of a carrier and conversion into modulated signals. The transceiver 104 conveys the modulated signals to the antenna 102 for transmission to a remote transceiver (not shown).

The input and output devices may include a variety of visual, audio and/or motion devices. The output devices may include, but are not limited to, the display 108 (such as liquid crystal displays and light emitting diode indicators) and the audio outputs (such as speakers, alarms and buzzers) of the audio input & output 112. The input devices may include, but are not limited to, the user input 110 (such as keyboards, keypads, selection buttons, touch pads, touch screens, capacitive sensors, motions sensors, and switches) and audio inputs (such as microphones) of the audio input & output 112.

The internal components of the wireless communication device 100 further include the memory circuit 114 for storing and retrieving data and the timing circuit 116. The processor 106 may perform various operations to store, manipulate and retrieve information in the memory circuit 114. The configuration information specified by the service provider is stored in the memory along with duration information specifying how long the configuration is to be in effect. The timing circuit 116 may include clock circuitry that provides the current time and/or a timer that provides elapsed time from a particular starting time such as the beginning of the duration of the configuration. It is to be understood that, for the invention described herein, the word "time" is used broadly to includes calendar dates as well as times of day. Unless the processor determines that the elapsed time has exceeded the duration, the processor prevents modification to the configuration information to be made. However, the processor may allow modification before the end of the duration of the configuration upon receiving a proper password.

The internal components of the wireless communication device 100 may further include a component interface 118 and a power supply 120. Accessories and additional components may be coupled to the component interface 118 to provide additional functionality and capabilities to the device 100. The power supply 120, such as a battery, is controlled by the processor 106 and provides power to the internal components so that they may function correctly.

Figure 2:
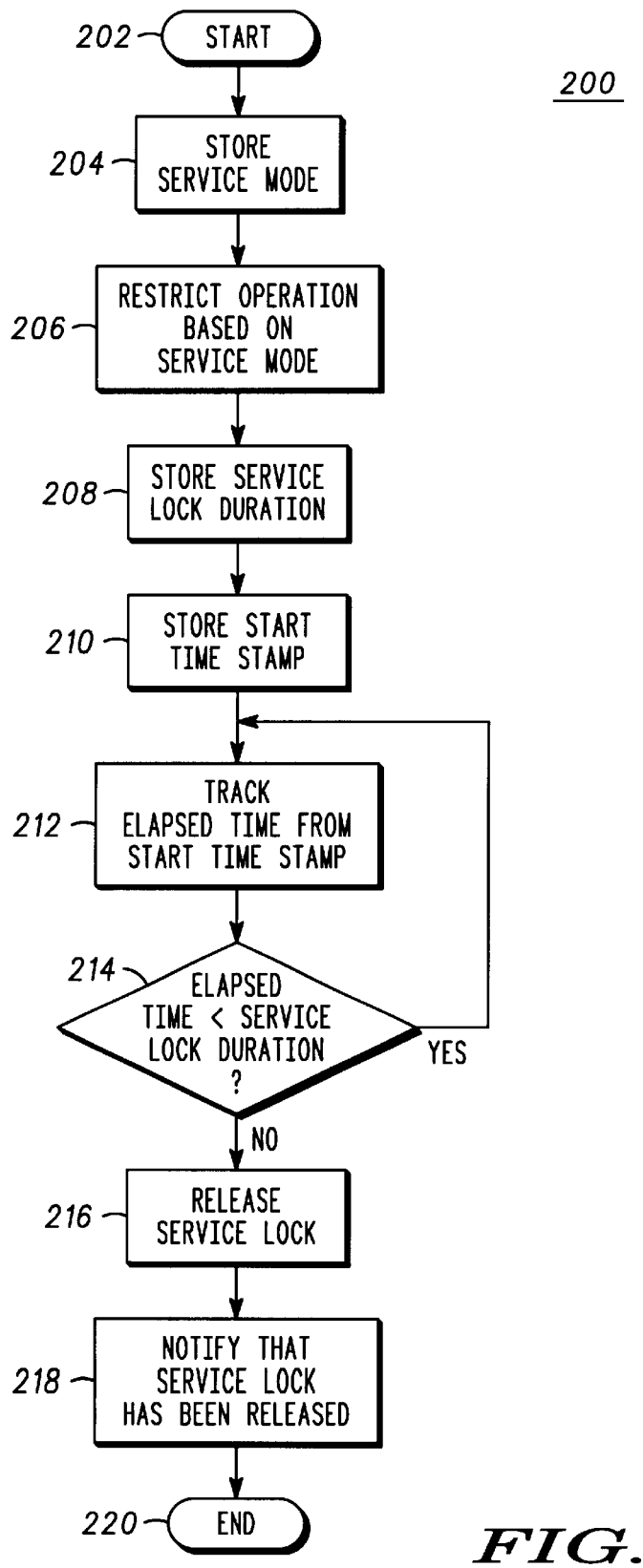
FIG. 2 is an exemplary flowchart of one of the aspects of the present invention.

FIG. 2 is an exemplary flowchart of one of the aspects of the present invention. Before a subscriber receives and is able to use a wireless communication device 100, preferable a cellular portable telephone, the wireless communication device needs to be programmed with a service mode, which configures the wireless communication device to match a specific configuration provide by a service provider with whom the subscriber has a subscription contract for a certain period of time, for example, for two years. In block 204, the wireless communication device stores in its memory 114 the service mode. Once the service mode is stored, the wireless communication device is prevented from accepting another service mode or modifying the current service mode by a service lock. By storing the service mode, the wireless communication device becomes identified with the service provider, and its operation becomes restricted to the configuration provided by the service mode in block 206. In block 208, a service lock duration, which is the duration of the subscription contract, is also stored. The wireless communication device then stores a start time stamp to mark the start of the subscription contract, i.e., the service lock duration, in block 210. The marking of the start time stamp may be accomplished by recording the time provided by an internal clock 116 of the wireless communication device when the wireless communication device is powered on for the first time in the service mode. The internal clock of the wireless communication device may be synchronized, upon powering on and/or off, to the time kept by a wireless communication network where the wireless communication device is being used.

In block 212, the wireless communication device begins to track the elapsed time from the time marked by the start time stamp. The tracking of the elapsed time may be accomplished by tracking the time kept by the internal clock of the wireless communication device. In block 214, the wireless communication device compares the elapsed time from the time marked by the start time stamp to the service lock duration. If the elapsed time is less than the service lock duration, the wireless communication device keeps tracking the elapsed time and, the process repeats from block 212. If the elapsed time is greater than or equal to the service lock duration, then the wireless communication device releases the service lock in block 216.

Although by releasing the service lock, the wireless communication device is now able to accept a new service mode or a modification to the current service mode, a new service mode or a modification to the existing service mode need not be entered for the wireless communication device to continue functioning as before. When the wireless communication device releases the service lock, it may notify the subscriber, for example, by displaying a message indicating that the service lock has been removed in block 216, and the process terminates in block 218.

Figure 3:
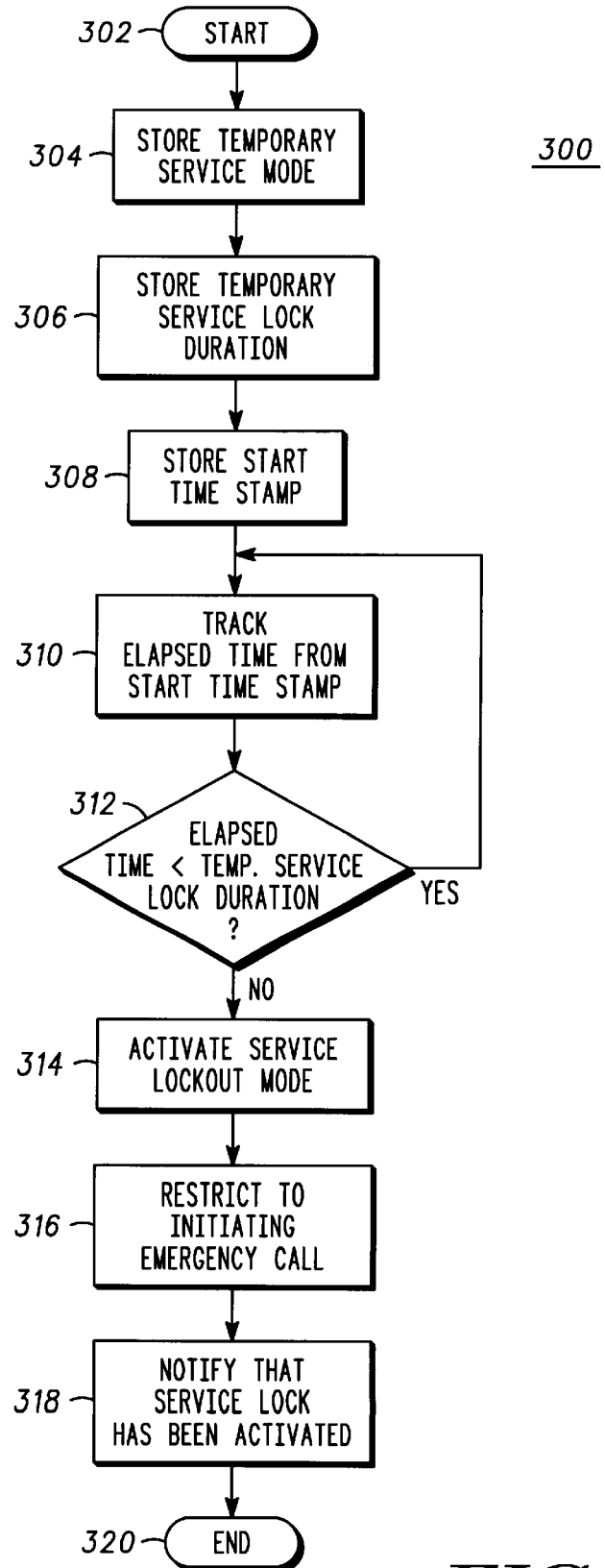
FIG. 3 is an exemplary flowchart of another aspect of the present invention.

FIG. 3 is an exemplary flowchart of another aspect of the present invention. In block 304, the wireless communication device stores in its memory a temporary service mode, which allows normal operation of the wireless communication device for a predetermined period of time, i.e., temporary service duration. The temporary service mode may be activated by a predetermined method such as, but not limited to, entering an activation password or selecting a menu item. Once the temporary service mode is activated, it may be deactivated anytime by entering a deactivation password. In block 306, the wireless communication device also stores the temporary service duration in the memory. The wireless communication device then stores a start time stamp to mark the start of the temporary service duration, in block 308. The marking of the start time stamp may be accomplished by recording the time provided by an internal clock of the wireless communication device when the wireless communication device is powered on for the first time in the temporary service mode. The internal clock of the wireless communication device may be synchronized, upon powering on and/or off, to the time kept by a wireless communication network where the wireless communication device is being used.

In block 308, the wireless communication device then begins to track the elapsed time from the time marked by the start time stamp. The tracking of the elapsed time may be accomplished by tracking the time kept by the internal clock of the wireless communication device. In block 312, the wireless communication device compares the elapsed time from the time marked by the start time stamp to the temporary service duration. If the elapsed time is less than the temporary service duration, the wireless communication device keeps tracking the elapsed time and, the process repeats from block 310. If the elapsed time is greater than or equal to the temporary service duration, then the wireless communication device activates a service lockout mode in block 314. The service lockout mode disables the normal operation of the wireless communication device and restricts the operation of the wireless communication device to only initiating a call to an emergency number in block 316. When the wireless communication device activate the service lockout mode, it notifies the subscriber, for example, by displaying a message indicating that the service lockout mode has been activated in block 318, and the process terminates in block 320. To avoid a sudden termination of a call, a notice of the service lockout mode activation may be given prior to the activation, for example, one day or one hour before the activation. Once the service lockout mode is activated, it may be deactivated by entering another password, which may be the same as the deactivation password for deactivating the temporary service mode.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method in a communication device for autonomously releasing a service lock having a first service mode associated with a first service provider, the method comprising:

storing the first service mode;

preventing modification of the first service mode for a defined time period;

operating the communication device based upon the first service mode;

monitoring for expiration of the defined time period;

releasing the service lock after the expiration of the defined time period;

permitting to accept a second service mode associated with a second service provider; and providing a notice of the service lock release.

2. The method of claim 1, receiving an external input to define the defined time period, wherein the external input is at least one of a start time, an end time, and a time duration of the defined time period.

3. The method of claim 2, storing a start time stamp indicative of the start time of the defined time period upon powering of the communication device on for the first time in the first service mode.

4. The method of claim 3, wherein monitoring for the expiration of the defined time period by tracking an elapsed time period from the start time stamp by an internal clock of the communication device.

5. The method of claim 1, preventing modification of the first service mode for a defined time period includes allowing modification of the first service mode during the defined time period if a defined code is received.

6. A communication device configured to autonomously release a service lock having a first service mode associated with a first service provider, the communication device comprising:

a memory circuit configured to store the first service mode;

a processor coupled to the memory circuit, the processor configured to prevent modification of the first service mode for a defined time period and to operate the communication device based upon the first service mode for the defined time period;

a timer coupled to the processor, the timer configured to monitor for expiration of the defined time period; and a notifier coupled to the timer, the notifier configured to provide a notice of the expiration of the defined time period, wherein the processor is further configured to release the service lock after the expiration of the defined time period and to accept a second service mode associated with a second service provider.

7. The communication device of claim 6, wherein the processor is further configured to modify the first service mode during and after the defined time period if a password is received.

8. The communication device of claim 7, further comprising a password circuit coupled to the processor, the password circuit configured to receive the password and to enable the processor to modify the first service mode during the defined time period upon receiving the password.

9. A program for a communication device for autonomously releasing a service lock having a first service mode associated with a first service provider, the program comprising:

computer readable program code that stores the first service mode;

computer readable program code that prevents modification of the first service mode for a defined time period;

computer readable program code that operates the communication device based upon the first service mode for the defined time period;

computer readable program code that monitors for expiration of the defined time period;

computer readable program code that provides a notice of the expiration of the defined time period;

computer readable program code that releases the service lock after the expiration of the defined time period; and computer readable program code that accepts a second service mode associated with a second service provider.

10. The program of claim 9, wherein the computer readable program code that prevents modification of the first service mode for a defined time period includes computer readable program code that allows modification of the first service mode during the defined time period if a defined code is received.

* * * * *